US009111149B2

(12) United States Patent
Lehnert et al.

(10) Patent No.: US 9,111,149 B2
(45) Date of Patent: *Aug. 18, 2015

(54) BIOMETRIC IDENTIFICATION AND ANALYSIS

(75) Inventors: Thomas R. Lehnert, Herndon, VA (US);
Jeffrey C. Boushell, Chantilly, VA (US);
Peng Yuan, Leesburg, VA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,051

(22) Filed: Mar. 11, 2011

(65) Prior Publication Data

US 2011/0221567 A1   Sep. 15, 2011

Related U.S. Application Data

(62) Division of application No. 11/356,061, filed on Feb. 17, 2006, now Pat. No. 7,929,733.

(51) Int. Cl.
*G06K 9/00* (2006.01)
*G06K 9/62* (2006.01)

(52) U.S. Cl.
CPC ........ *G06K 9/00885* (2013.01); *G06K 9/00677* (2013.01)

(58) Field of Classification Search
None
See application file for complete search history.

(56) References Cited

U.S. PATENT DOCUMENTS

| 3,994,225 | A  | * | 11/1976 | Sitzberger | 101/485 |
|---|---|---|---|---|---|
| 5,761,329 | A  | * | 6/1998  | Chen et al. | 382/116 |
| 7,356,168 | B2 | * | 4/2008  | Tavares | 382/115 |
| 7,454,624 | B2 | * | 11/2008 | LaCous | 713/186 |
| 7,564,994 | B1 | * | 7/2009  | Steinberg et al. | 382/118 |
| 7,949,156 | B2 | * | 5/2011  | Willis | 382/115 |
| 2003/0118216 | A1 | * | 6/2003 | Goldberg | 382/115 |
| 2004/0133582 | A1 | * | 7/2004 | Howard et al. | 707/100 |
| 2004/0213437 | A1 | * | 10/2004 | Howard et al. | 382/115 |

OTHER PUBLICATIONS

Wang et al. ("Combining Fingerprint and Voiceprint Biometrics for Identity Verification: an Experimental Comparison", ICBA 2004, LNCS 3072, pp. 663-670, 2004).*

* cited by examiner

*Primary Examiner* — Thomas Conway

(57) ABSTRACT

A system and method for identifying an unknown individual from a plurality of enrolled individuals is provided. In an embodiment, the method comprises comparing at least two parameters of the unknown individual to at least two enrolled parameters of the enrolled individuals. The method then determines a score correlating to the closeness of the comparison and then stores the score.

20 Claims, 8 Drawing Sheets

BIOMETRIC IDENTIFICATION AND ANALYSIS

Certain subject matter disclosed and claimed herein was developed under a contract with the United States government (No. H98230-04-C-1711). The U.S. government has certain rights in this invention.

CROSS REFERENCE TO RELATED APPLICATIONS

This application is a divisional of U.S. patent application Ser. No. 11/356,061, filed on Feb. 17, 2006, the contents of which are hereby incorporated by reference in its entirety.

BACKGROUND

A biometric may be used to identify a person or to verify identity. Biometrics may also be used by systems for identification of persons and authentication of identity. A known method of biometrically identifying others relies on use of fingerprints. The system typically requires a fingerprint from a known individual. A fingerprint from an unknown person may then be compared with the saved fingerprint in order to determine if the unknown person is the known individual.

A computerized system is also possible wherein collections of fingerprint samples are scanned, assigned identities, and stored in a database. A fingerprint from an unknown person may then be scanned into the system. The system then searches the database of known fingerprints and compares the known fingerprints with the unknown fingerprint. If certain thresholds are met, the system then outputs a "match" that signals a high probability of identification. The stored identity of the matching fingerprint from the database is then used to hopefully identify the unknown person.

Additionally, biometric identification methods use single types of information, such as voice, retina, photo, or biographical data, to identify individuals. The systems may review a retinal scan, a fingerprint scan, or a voice identification to control access to locations or information.

However, systems lack a fusion of these sources and types of biometric information relating to identity. Further, these systems require the assistance of an individual in order to collect data. For example, a voice identification system requires an individual to repeat a phrase to obtain baseline data. Identification is performed by having the individual repeat the same phrase and comparing this phrase with the stored phrase. Such systems do not allow for a robust identification system and are prone to error and poor performance. Further, the systems do not provide for the correlation of individuals with their associates using multiple biometric information sources.

Accordingly, it would be highly desirable to be able to collect information from various sources and identify a subject individual without inconveniencing or requiring the cooperation of the individual. Importantly, it is desirable to fuse multi-modal biometric analysis having a unified interface for ease of operation. It is further desirable to allow for enrollment, searching, and identifying of new individuals. It is also highly desirable to be able to analyze and correlate identities of individuals with their associates. Additionally, it is highly desirable to fuse the collection of multiple data sources, identification using multiple data sources, permitting identification and correlation using a common interface. It is also desirable to provide standard interfaces to work cooperatively with off-the-shelf biometric identification software and systems to perform specific collection and analysis functions.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
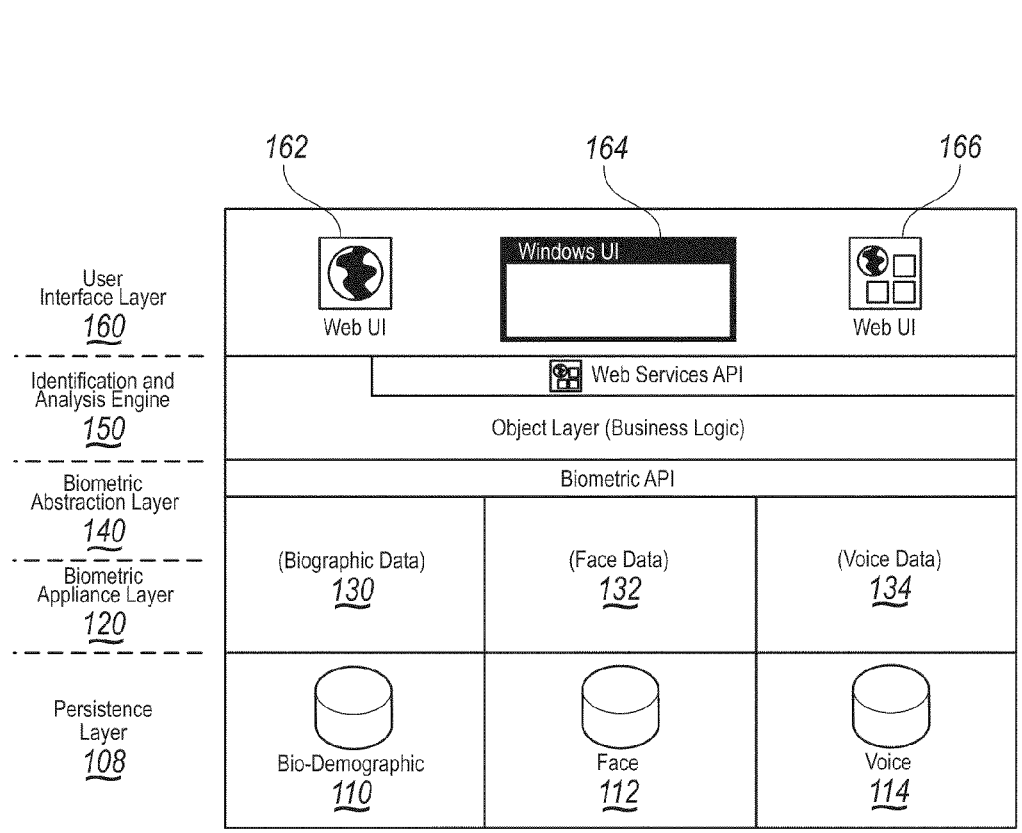
FIG. 1 is an architecture diagram of an identification system, according to an illustrative embodiment.

Referring now to the drawings, illustrative preferred embodiments are shown in detail. Although the drawings represent the embodiments, the drawings are not necessarily to scale and certain features may be exaggerated to better illustrate and explain various aspects of an embodiment. Further, the embodiments described herein are not intended to be exhaustive or otherwise limit or restrict the invention to the precise form and configuration shown in the drawings and disclosed in the following detailed description.

I. Overview

It is now common to use biometric tools for identification of individuals within the United States and elsewhere. These identification tools are used for access control on a voluntary basis as well as for identification in public. Disclosed herein is an identification and analysis system that improves identification probability as well as combines multiple biometric and non-biometric sources by way of a multi-modal biometric analysis that uses sensor fusion to further enhance appropriate identification. In particular, for example, an ordered list is provided having the most probable matches where the correctly identified individual is preferably the most likely match generated by the system.

The following system includes the capability to determine social networks by the system, given a database containing stored information of multiple subject individuals. The social network may then be used to identify associates of a known individual as well as to provide yet another source for sensor fusion. A bio-demographic filter function is also provided that allows a user to narrow identity searches using personal characteristics as well as any other element in the database.

Additionally, the system includes the capability for supporting "plug-and-play" integration of commercially available biometric identification software. The plug-and-play support allows for multiple methods of identification as well as simplified integration. The system further provides for scalability applicable to field-level (on-site investigator) through an enterprise-level (analysis and investigation) usage.

A. Architecture

FIG. 1 shows the general architecture of an identification system 100. A persistence layer 108, a biographical database 110, a face database 112, and a voice database 114 provide persistent storage for physical and bio-demographic characteristics of an individual. A biometric appliance layer 120 provides a pluggable interface for off-the-shelf biometric analysis products as well as custom analysis products for use with identification system 100. In this embodiment, a biographical data appliance 130, a face identification appliance 132, and a voice identification appliance 134 are shown. Further, a biometric abstraction layer 140 is provided to allow for plug-and-play interfacing with identification and analysis engine 150.

A user interface 160 provides access to the identification and analysis engine 150 and includes a web interface 162, a workstation interface 164, and a web services interface 166. Web interface 162 is typically used by field personnel to access identification system 100 from remote locations. Workstation interface 164 is used by analysts at an office location, and web services interface 166 is used by other high-level analysis systems for direct and automated access to identification system 100. However, it is understood that interfaces 162, 164, and 166 may be used alone, or in combination, regardless of connection type and location. Further, user interface 160 provides for flexible and custom adaptation and integration with systems and users.

The integration of off-the-shelf biometric analysis components in appliance layer 120 provides a user with a common interface that provides a standardized interface for use of identification system 100. The common interface overcomes the challenges and inefficiencies of training a user for multiple analysis components. Further, biometric abstraction layer 140 provides a standard interface for designing identification and analysis engine 150. Thus, the challenges of widely differing programming languages and architectures are abstracted for ease of use as well as simplified design of identification and analysis engine 150.

II. Inputs

A. Voice

Voice inputs are sampled from a variety of sources, including phone conversations, live input, and recordings. Known to those skilled in the art, voice identification systems typically receive inputs using a standard digitized representation of the voice (e.g., a .wav file). The voice inputs may be captured with the consent and cooperation of a subject individual or they may be captured without inconveniencing the individual. In either case, the digital representation of the voice is stored in a computer readable medium for storage.

Typical voice data is digitally recorded at sampling rates in the range of about 8 KHz and 16 KHz. The digital recording may then be filtered to remove ambient noise or errant sounds outside the normal range of human speech (e.g., cell phone noise). The duration of the voice recording is inconsequential. However, recordings ranging from 15 to 30 seconds are preferable for data management purposes. Further, as an initial matter, the voice recordings may be sent to a voice recognition system to generate transcripts of the recording.

B. Face

Face inputs are sampled from a variety of sources including, but not limited to, a still photograph and video sources. The face inputs are provided in a standard digital file format (e.g., a .jpg file) for use with identification and analysis engine 150. It is preferred to include multiple photos of the individual taken from different angles. The face inputs may include multiple individuals (i.e. a photo of a crowd), explained in detail below with respect to social networks. As with the voice recordings, the images may be captured with or without the active assistance of the subject individual.

The face inputs are preferred with differing "looks" of the individual to account for natural variations in a person's appearance over time or for the conditions of the photo (e.g., sunny or dark conditions). For example, bushy eyebrows may obscure the eyes or the angle of the sun may cast a shadow over the eyes. Eyeglasses, or the absence of eyeglasses, may drastically change the face identification analysis results. Further, the rotation of the individual's head is of concern where the individual is not being inconvenienced by the face data collection. For example, under controlled conditions, the individual will look straight at a camera to provide the face input. However, in un-controlled conditions, face collection takes place subject to random movement by the individual along with the photographic conditions of the environment.

C. Database

Figure 2A:
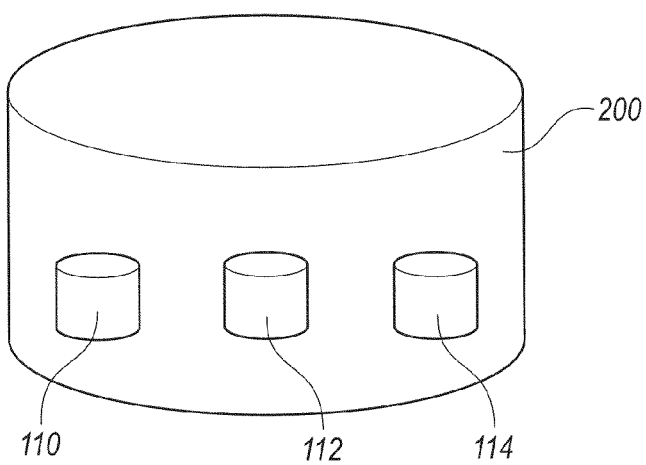
FIG. 2A is a database diagram, according to an illustrative embodiment.

Turning now to FIG. 2A, an aggregate database 200 is shown that includes biographical database 110, face database 112, and voice database 114. Aggregate database 200 generally performs to provide a broad-based repository of data on individuals for use with biometric appliances 130, 132, and 134. Further, aggregate database 200 may be embodied as a single database, or a collection of databases 110, 112, 114. Biographical database 110 includes bio-demographic data, such as height, eye color, occupation, citizenship, et al. Face database 112 includes picture objects that include the faces of individuals having a single angle or multiple angles and facial expressions. Voice database 114 includes digital representations of the individual's voice.

Figure 2B:
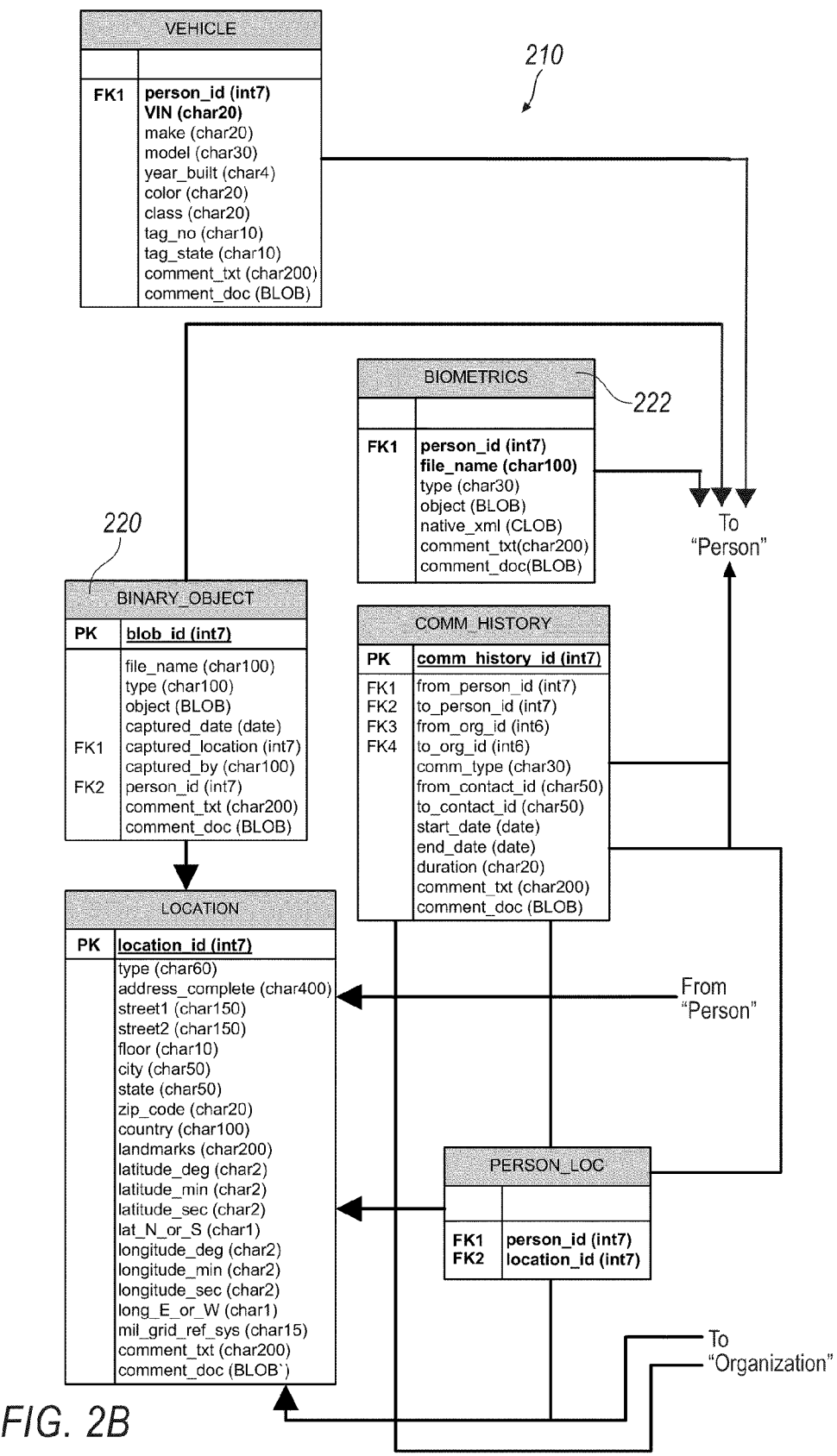
FIGS. 2B and 2C are a database schema for the database of FIG. 2A, according to an illustrative embodiment.
Figure 2C:
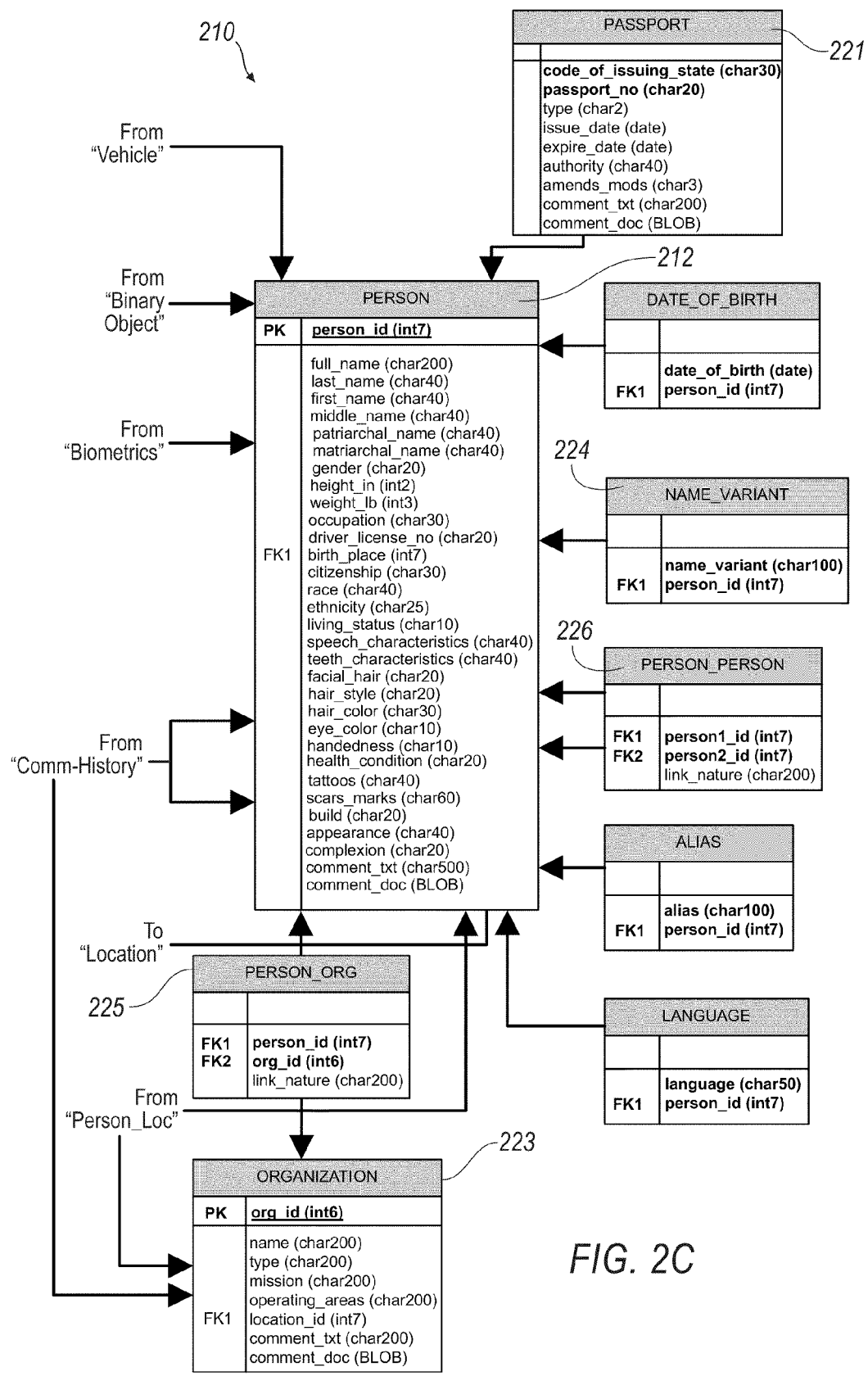

FIGS. 2B and 2C show schemas 210 for aggregate database 200. Schemas 210 include information that may be combined in a single database or separated into multiple databases. Whatever the configuration, schemas 210 represents the data relations configured for aggregate database 200. The central identifier is a person schema 212 for a person entity that represents an enrolled individual. As information is collected and individuals are enrolled (explained below in detail with respect to "enrollment" and "collection"), bio-demographic data is stored as multiple entities, as well as face data and voice data.

As illustrated by FIGS. 2B and 2C, there are multiple types of relations in one-to-one, one-to-many, and many-to-many configurations. Binary information is stored in a binary entity 220 and/or a biometric entity 222. Each of binary entity 220 and biometric entity 222 relate to person schema 212. Embedded within binary entity 220 are a file name, type of binary object, the binary object itself (BLOB), time, date, and comments. Biometric entity 222 contains information related to the type of biometric, the biometric binary data, and objects. A bio-demographic object 224 typically contains text information such as date of birth.

In detail, person schema 212 identifies an individual (person). The other schemas of aggregate database 200 generally relate other information to the person schema 212. For example, passport information 221 contains bio-demographic information in the form of text data including issuing state, issue date, expiration date, and comments. Biometric entity 222 can contain a file name, a photograph or a voice recording. Further, as illustrated by a general binary entity 220, the binary object (typically a photograph or voice recording) may include metadata related to the binary object such as captured date, captured location, and comments. To this end, aggregate database 200 includes multiple types of information organized in schema that are attributed to person schema 212 and are also searchable individually so as to filter within the database (explained below in detail in the section entitled "Filtering").

Additionally, multiple levels of information may be attributed to person schema 212. For example, an organization schema 223 is not directly linked to person schema 212. However, a person-organization schema 225 links person schema 212 with the organization by including the person identification number and organization identification number as foreign keys. Further, the nature of the person-organization schema 225 link is stored.

Although not explicitly shown in FIGS. 2B and 2C, aggregate database 200 may include all of the relational database objects in a single database, or may include separate databases for biographical database 110, face database 112, and voice database 114. Alternatively, a combination of mixed and separate databases may be employed.

D. Enrollment

Figure 3:
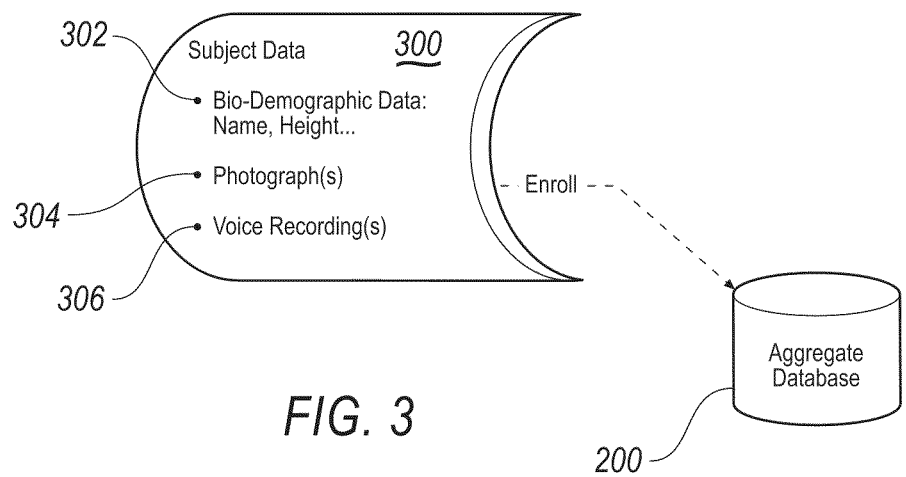
FIG. 3 is a data diagram of an enrollment system, according to an illustrative embodiment.

FIG. 3 shows an enrollment system including data 300 about an individual ("subject data"), and aggregate database 200. Subject data 300 includes bio-demographic data 302, photograph(s) 304, and voice recording(s) 306. Database input is performed through an individual enrollment process that may be performed through web interface 162, workstation interface 164, and/or web services interface 166. However, elements of aggregate database 200 may also be added, updated, or deleted without the cooperation of identification system 100. That is to say, an outside application (not shown) may interface with aggregate database 200 to change the contents.

Enrollment of an individual begins through any of interfaces 162, 164, 166 that are provided as a graphical user interface. Bio-demographic data 302 is entered via drop-down lists and text entry boxes and is then stored in biographical database 110 typically as text information. Enrollment continues with an uploading of photographs 304 of the individual to face database 112, and voice recordings 306 to voice database 114. Enrollment completes when all relevant information is uploaded for the individual.

Alternatively, enrollment may occur automatically given sources of input connecting to identification system 100. These automatic sources may include, for example, a motor vehicle registration site where an individual's photograph 304 is taken along with entry of bio-demographic data 302. Thus, the automatic enrollment process expedites speedy entry of subject data 300 into aggregate database 200, as well as minimizing inconvenience to the individual or duplicate efforts in enrollment.

III. Operation

Figure 4:
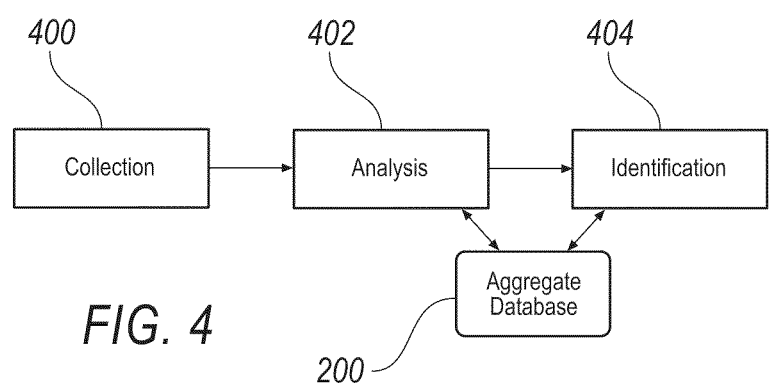
FIG. 4 is a system diagram of an identification and analysis engine, according to an illustrative embodiment.

FIG. 4 shows an overview of identification and analysis engine 150 and includes a collection system 400, an analysis system 402, an identification system 404, and aggregate database 200. The operation of identification system 100 provides for a one-to-many identification of an individual using, when available, bio-demographic data 302, photographs 304, and voice recordings 306.

A. Collection System

Collection system 400 provides for the acquisition of data of an individual and includes bio-demographic data 302, photographs 304, and voice recordings 306. Collection system 400 is configured to receive inputs collected with or without inconveniencing the individual. Further, collection system 400 may be automated to receive inputs from a variety of sources including surveillance cameras, microphones, wiretaps, and cell phone monitors. In general, collection includes the taking of pictures or videos and voice recordings and the amassing of bio-demographic data associated with an individual.

B. Analysis System

Analysis system 402 provides for the cataloging, storing, and examining of data input from collection system 400 and the enrollment process. Aggregate database 200 provides functions for storage and retrieval to allow for analysis of the stored information. Further, aggregate database 200 allows for filtering functions that provide further analysis through the presentation and examination of particular subsets of data, including voice, photo, and bio-demographic data. This filtering is possible in aggregate database 200 without the necessity of traversing the entire collection of information contained in aggregate database 200.

C. Identification System

Figure 5:
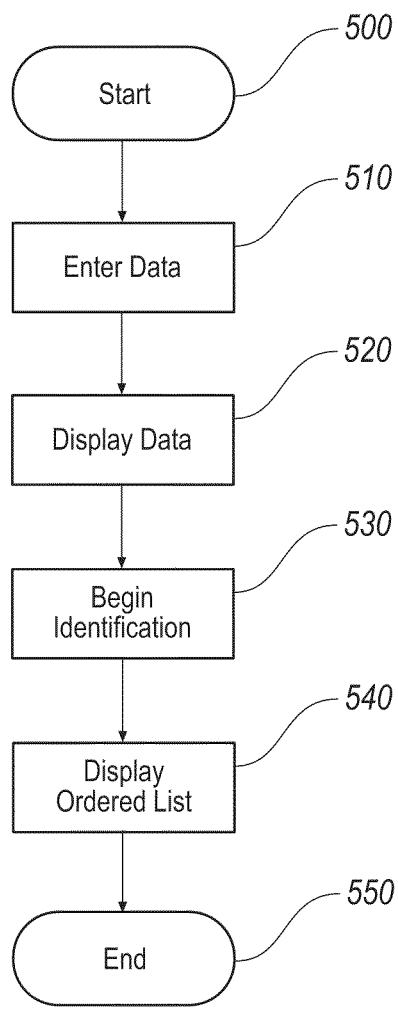
FIG. 5 is a process flow diagram of an identification system, according to an illustrative embodiment.

Identification system 404 extracts likely candidates and produces a list of potential matches regarding the identity of an unknown individual using analysis system 402 and the elements of aggregate database 200. The identification of an individual is provided to a user by a graphical user interface. In one illustrative embodiment, an analyst then reviews the list and draws conclusions based on the information provided. In other embodiments, however, human intervention is minimized. FIG. 5 shows a flow diagram of the identification process starting at entry step 500. Control then proceeds to step 510.

Biographical data of an unknown individual is entered to the extent known in step 510 via an entry system similar to the enrollment process. The data entered is in a form compatible with the previously collected data, or the data is converted to a compatible form. Photograph(s) 304 (.jpg file) and voice recordings 306 (.wav file) are then uploaded to identification system 100. Further, any element in aggregate database 200 may be entered for inclusion in the identification process. A combination of the three types of data, or any one or two of them, may be entered to perform the identify operation. The information entered for comparison is considered "probe data." Control then proceeds to step 520.

In step 520, the individual's image may be displayed and the voice data may be played for review. Further, the bio-demographical data may be reviewed for accuracy. Indeed, any element in aggregate database 200 may be reviewed. Control then proceeds to step 530.

In step 530, upon the request of a user, the identification begins with a database search and comparison of aggregate individual data (explained in detail below) based on the probe data. Control then proceeds to step 540.

In step 540, a list is displayed of potential individuals matching the probe data. The list is ordered from top to bottom, with the individual most similar to the probe at the top. The top individual has the highest fusion score and the list continues down, ordered by decreasing fusion scores.

Provided in the graphical user interface, convenient tabs allow for face to face, voice to voice, and bio-demographic comparison with the probe data and the identified individual(s). This one-to-one comparison does not include the fused data score, but rather, is an individual score for that particular metric (e.g., face score, voice score, and bio-demographic score). A similarity score is then displayed for each individual relative to the probe data.

An analyst draws conclusions, if any, for the most likely individual matching the probe data based upon the ordered list provided. The identification process ends at step 550.

1. Sensor Fusion

Sensor fusion (also known as "data fusion") is a process by which multiple biometric comparisons are combined into a single score that reflects the overall similarity of a probe individual to an enrolled individual. Further, fusion of multiple biometrics increases identification accuracy. For enrolled individuals with multiple biometrics present in aggregate database 200, the score is based on the total of the highest scores from each set of biometrics.

In this embodiment, each biometric comparison is scaled to a common scale for comparison. The results of the common scaling are then added and divided by the number of biometrics used to produce a fused score. Generally, each face or voice comparison produces a similarity score in the range of zero (0) to ten (10). For example, a fusion voice and face biometrics with individual similarity scores of 6.0 and 7.0 respectively, yields a fused similarity result of $6.5=((6+7)/2)$.

When multiple entries (e.g., three face pictures) are stored in aggregate database 200 for a single enrolled individual, separate scores are presented (discussed in step 540 above) for each of the multiple entries (e.g., three separate scores, one for each face picture) on the tab pages. However, the fusion results page will only display a single fusion score, using the highest from each biometric for each individual. Thus, the fusion results page presents a scaled overall confidence of the match of the probe data to the enrolled individual.

The fusion process is further refined by characterizing the relative strength of each biometric, i.e., determining how much confidence should be placed in face vs. voice comparison, so that individual results can be weighted accordingly. The characterization of biometrics is a mission-specific step that is taken depending upon the goal of the identification system. The relative weight assigned to a biometric depends on factors related to the objective of the mission as well as restrictions having to do with the nature of the biometric to be modified. For example, a relative weight to be assigned to a face may depend upon the light available to take a photo (e.g., indoor or outdoor). Further, if the photo is particularly poor in quality, field personnel or the system itself may de-emphasize the photo by assigning a low relative weight that is persistent.

As described above, the fusion process is applied at multiple levels. A low-level fusion is applied to data of the same type (e.g., voice or face or bio-demographics). Thus, a weight and combined score for a single type of information is provided for identification. For example, where there exists four samples of face information, the low-level fusion will weigh each of the four face samples to produce a single result for the face data. Thus, the information is fused at a low-level.

In comparison, a high-level fusion described above combines different types of information into a single score. For example, the high-level fusion of voice, face, and bio-demographic information is given weights at the high-level to produce a single result (score) from a group of diverse types of data. In summary, the low-level fusion operates on data of the same type to produce a single result for the type, whereas the high-level fusion operates on data of differing types to produce a single result. However, as is known in the art, the fusion process may also include hybrid types that may incorporate data fusion of many of the same types and many different types in the same operation or process. Thus, the fusion process is not strictly limited to the levels discussed herein.

Figure 6:
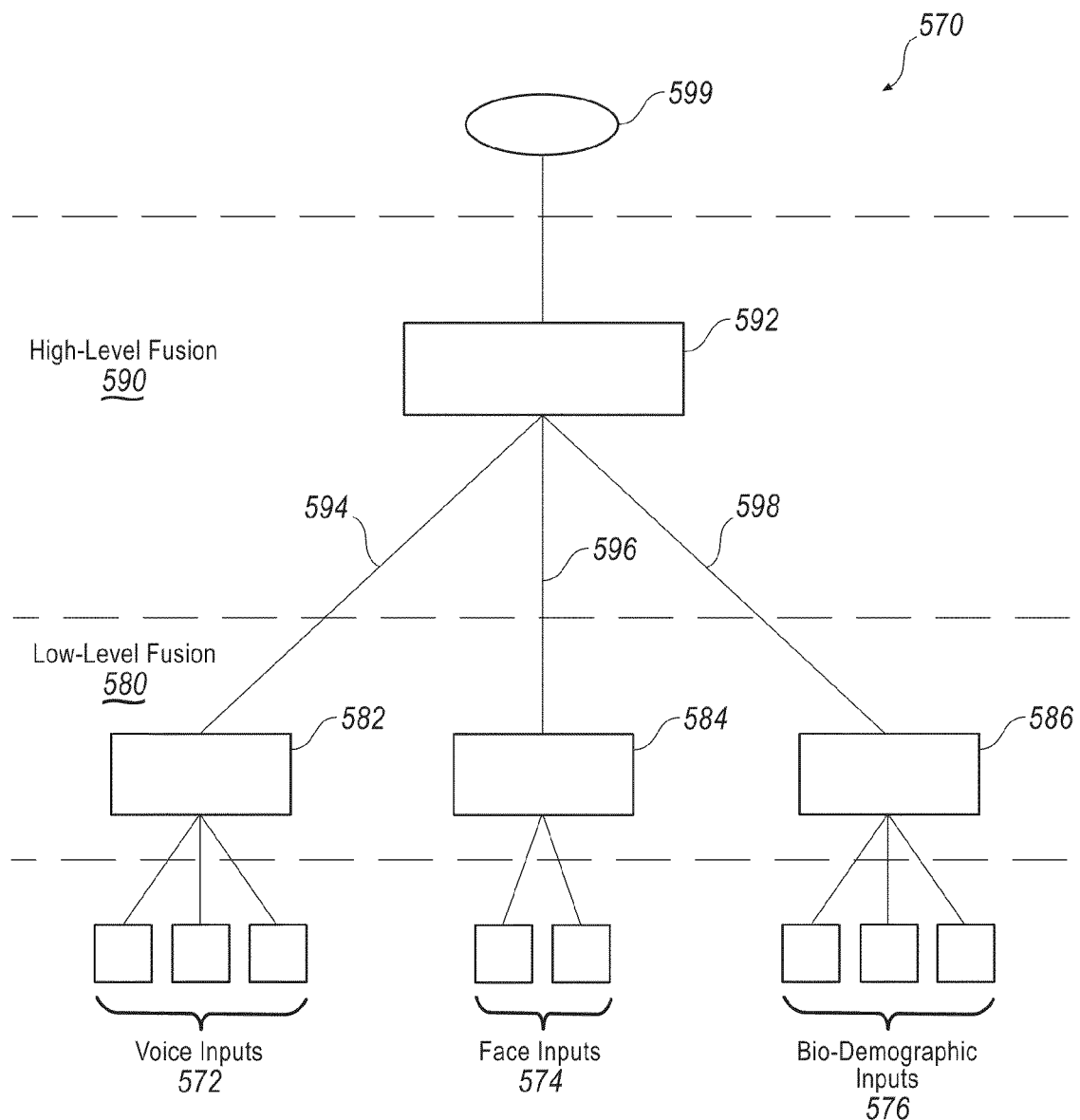
FIG. 6 is system diagram of a low-level fusion and high-level fusion system, according to an illustrative embodiment.

FIG. 6 is a system diagram of a fusion system 570 including a low-level fusion layer 580 and a high-level fusion layer 590, according to an illustrative embodiment. Voice inputs 572, face inputs 574, and bio-demographic inputs 576 are input to low-level fusion layer 580. Low-level fusion layer 580 includes separate fusion subsystems including a voice fusion subsystem 582, a face fusion subsystem 584, and a bio-demographic fusion subsystem 586. Each fusion subsystem 582, 584, 586, individually weighs its own category of input (e.g., voice, face, bio-demographic data) and outputs a single score.

Voice fusion subsystem 582 outputs a single voice score 594, face fusion subsystem 584 outputs a single face score 596, and bio-demographic fusion subsystem 586 outputs a single bio-demographic score 598 to a high-level fusion system 592. When all fusion subsystems 582, 584, 586 have completed their fusion tasks, high-level fusion system 592 again ranks each of the single outputs of low-level fusion layer 580 to a single output of a single ranked score 599. In this way, the complexities of data fusion may be partitioned in a meaningful manner such that the data fusion weights may be assigned logically and without unnecessary interaction between data types. Alternatively, bio-demographic fusion subsystem 586 may be removed in fusion system 570 wherein data fusion is not taking place for bio-demographic inputs 576. Rather, a filter may be applied (explained below in detail in the section entitled "Filtering").

2. Filtering

In addition to sensor fusion, bio-demographic data is used to establish the set of enrolled individuals against which the identification is performed. For example, if "Last Name=Jones" is specified, only enrolled individuals with the last name of Jones will be compared to the probe's face and/or voice data to form the results set. If no bio-demographic data is entered, then the entire enrolled aggregate database 200 is examined.

By narrowing the set of enrolled individuals for comparison, there is a reduced probability of incorrect responses. Additionally, there is significantly reduced processing time required to compare each and every enrolled individual against the probe data. Thus, by narrowing the comparison set, accuracy and efficiency are increased. However, it necessarily flows that the information used to filter the enrolled individuals must be of a high confidence, or the true match for the probe data may be excluded from the search.

3. Social Networks

Figure 7A:
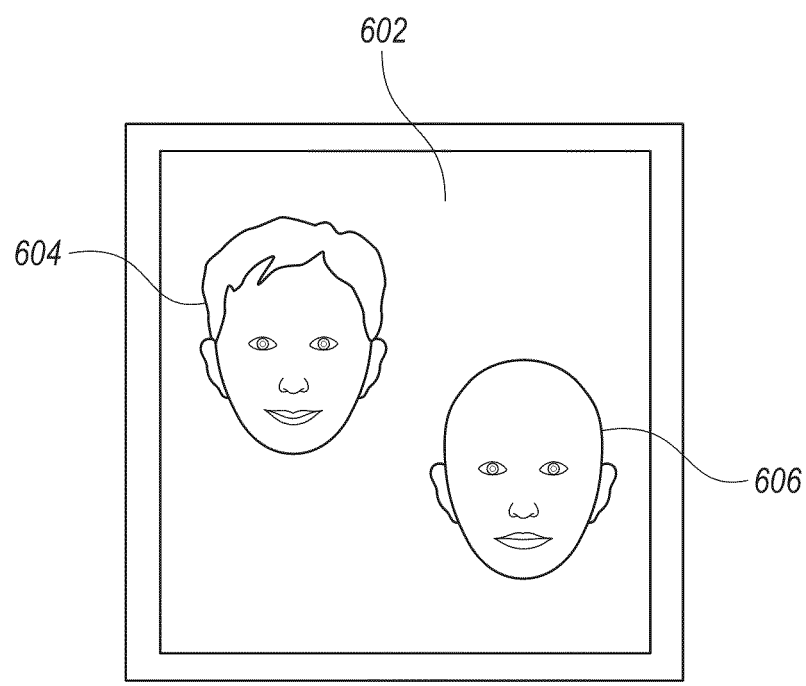
FIG. 7A is a photograph including two faces.
Figure 7B:
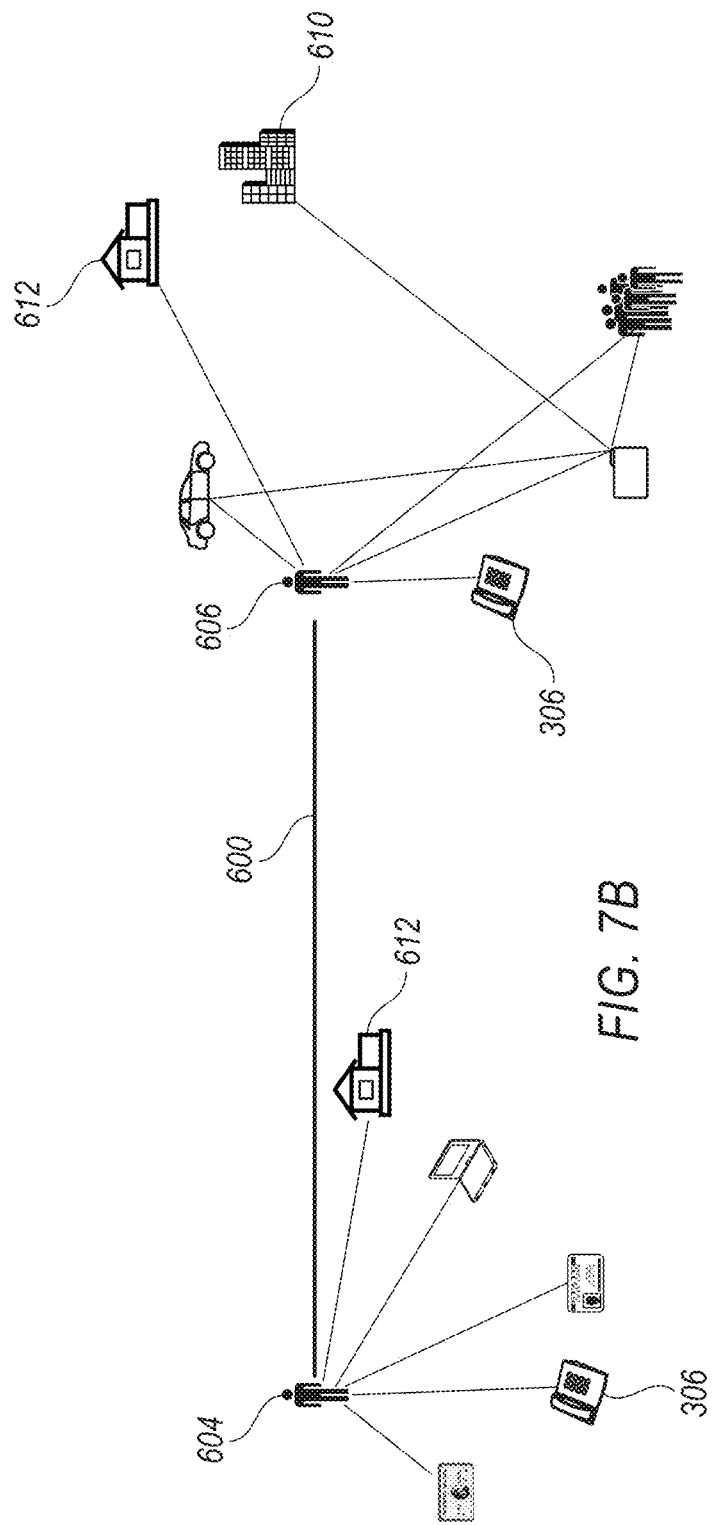
FIG. 7B is a social network diagram, according to an illustrative embodiment.

In addition to the described identification of a single individual, identification system 100 provides for the identification of a social network 600 illustrated in FIGS. 7A and 7B. Provided a single photograph 602 containing the faces of first individual 604 and a second individual 606 (see FIG. 7A), identification system 100 operates to identify each individual separately and then creates a link between the individuals 604, 606 in aggregate database 200 (see FIG. 7B). In this way, social network 600 is formed between the two individuals 604, 606 in the photograph.

In addition to photographic-based social network identification, identification system 100 also generates social network 600 from bio-demographic data 302 (e.g., employment location 610, residence address 612, name, phone records, financials, etc.) and voice recordings 306. Indeed, every element of aggregate database 200 may be selected alone or in sets to be used for generating social networks. Further, an analyst may manually link enrolled individuals in a social network.

As an example of linking of social network in aggregate database 200, a person-to-person schema 226 is linked to person schema 212. (See FIGS. 2B and 2C). Here, a first person's identification and a second person's identification (as foreign keys) are linked to person schema 212. The nature of the link is also indicated in a text field (e.g., friend, associate, co-worker etc.). When developing the social network, the person-to-person links may be established automatically or manually. Further, the person-to-person schema 226 is not limited to only two individuals. For where many individuals are included in a social network, multiple person-to-person schemas are included in aggregate database 200.

As described in FIG. 1, identification system 100 includes biometric abstraction layer 140 that allows for plug-and-play integration of biometric appliances. Thus, an off-the-shelf social networking appliance may be integrated with identification system 100 such that the social networking appliance integrates with aggregate database 200 for identifying social networks therein.

4. Identity Auditing

Also provided with identification system 100 is the ability to audit the identity of a subject individual. Using the identity audit process, a known individual may be compared with aggregate database 200 to periodically confirm their identity or to expose double entries in aggregate database 200. While it is theoretically possible that double entry of an individual in aggregate database 200 could occur, it is more likely that the individual is leading separate roles and may be working towards illicit goals.

For example, where the same person is stored in aggregate database 200 having matching photos and voice but the individual's biographical data 302 is drastically incorrect, an analyst may determine that the individual has separate personas, and thus aliases. In addition to simple criminal activity, the identity auditing may provide a simplified method for determining persons playing multiple covert roles. Additionally, enrolled individuals may be periodically checked against the other enrolled individuals to confirm or debunk a double entry. Further, when enrolling an individual, an automatic check against the already enrolled individuals is advised to avoid double entry.

IV. Conclusion

Given the preceding description, other embodiments of identification system 100 may include identification and analysis engine 150 installed on a personal digital assistant (PDA) including a portion, or the entirety, of aggregate database 200, as well as sensors for data collection and enrollment that may include a camera and a sound recorder. Thus, all of the functions, or a portion of the functions may be installed on a portable device for field officers' convenience. In the absence of such a PDA installation, a PDA may be used with web interface 162 and a wireless connection providing access to a server operating identification system 100.

Further, identification system 100 is expandable to include a variety of additional biometric identification systems (e.g., fingerprints and iris scanning) by adding new information to aggregate database 200. Aggregate database 200 may be modified to accept the new objects, and/or additional databases may be added to persistence layer 108 and linked to aggregate database 200. Thus, aggregate database 200 expands to contain the new biometrics. Further, due to the structure of identification system 100, enterprise-level security is a feature that may be readily implemented for sensitive operations.

In general, identification system 100 provides that data can be analyzed and correlated to identify individuals and their associates. Face and voice biometric identification, as well as bio-demographics, are encapsulated with a common interface to the user. Further, all information necessary for the identification process can be collected without inconveniencing an individual.

In this way, general identification can be made of an individual as well as developing knowledge regarding illicit social networks. Identification system 100 enables the correlation of faces and voices to identify individuals and relationship networks functioning for illicit purposes.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for the purpose of illustrating certain embodiments and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for identifying individuals using multiple sources of biometric information, the system comprising:
    a correlation system configured to identify multiple personas of a single individual based on the multiple sources of biometric information, wherein the correlation system is configured to identify the multiple personas based upon at least two types of biometrics associated with the single individual, and wherein the correlation system is configured to combine biometrics of a same type into a low-level fusion similarity score for each same type of biometric, and the correlation system is configured to combine biometrics of different types into a high-level fusion similarity score, the correlation system configured to identify the multiple personas based at least in part upon the high-level fusion similarity score; and
    a data store connected to the correlation system and configured to store the multiple sources of biometric information;
    wherein the correlation system is configured to initiate an automatic comparison of the single individual with a plurality of previously enrolled individuals upon enrollment of the single individual, and wherein the correlation system is configured to periodically compare the single individual with at least one other enrolled individual to determine whether the single individual is using multiple personas.

2. The system of claim 1, wherein the correlation system is configured to identify a social connection between the single individual and at least a second individual.

3. The system of claim 1, further comprising:
a plurality of biometric analysis systems, each of the plurality of biometric analysis systems configured to perform analysis including a different biometric parameter of the multiple sources of biometric information; and
an abstraction layer connected to each of the plurality of biometric analysis systems and the correlation system and configured to interface between the correlation system and each of the biometric analysis systems.

4. The system of claim 1, wherein the multiple sources of biometric information comprise at least a voice data source, a face data source, and a bio-demographic data source.

5. The system of claim 1, wherein the data store includes text information.

6. The system of claim 1, wherein the correlation system is configured to establish the multiple personas automatically from the at least two types of biometrics.

7. The system of claim 1, wherein the correlation system is configured to periodically identify whether a first biometric associated with a first enrolled individual matches a second biometric associated with a second enrolled individual, wherein the match indicates a multiple persona.

8. The system of claim 1, wherein the correlation system is a data fusion system configured to combine multiple biometric comparisons into a single score, the single score indicating a closeness of the comparison of the multiple biometric comparisons.

9. The system of claim 8, wherein the data fusion system includes a low-level fusion system and a high-level fusion system, the low level fusion system configured to combine the biometrics of the same type into the low-level fusion similarity score, the high-level fusion system configured to combine the biometrics of different types into the high-level fusion similarity score.

10. The system of claim 1, wherein the correlation system is configured to identify the multiple personas based upon at least a visual biometric.

11. The system of claim 10, wherein the correlation system is configured to establish the visual biometric from a photograph.

12. The system of claim 1, wherein the correlation system is configured to identify the multiple personas by comparing data associated with a first individual with data associated with a different individual in the data store.

13. The system of claim 12, wherein the correlation system is configured to identify the multiple personas by matching a first biometric associated with the first individual with a second biometric associated with the different individual included in the data store.

14. The system of claim 13, wherein the correlation system is configured to identify the multiple personas by matching one of a photo and a voice biometric of the first individual with a corresponding data type of the different individual.

15. The system of claim 13, wherein the correlation system is configured to identify the multiple personas by matching a first biometric of a first biometric type associated with the first individual with a second biometric of the first biometric type associated with the different individual and determining a lack of a match between a third biometric associated with the first individual and a fourth biometric associated with the different individual, the third and fourth biometrics each including biographic information.

16. A system for identifying individuals using multiple sources of biometric information, the system comprising:
a correlation system configured to identify multiple personas of a single individual based on the multiple sources of biometric information, wherein the correlation system is configured to identify the multiple personas based upon at least two types of biometrics associated with the single individual, the correlation system including:
a low-level fusion system configured to combine biometrics of a same type into a low-level fusion similarity score for each same type of biometric; and
a high-level fusion system configured to combine biometrics of different types into a high-level fusion similarity score, wherein the correlation system is configured to identify the multiple personas based at least in part upon the high fusion similarity score; and
a data store connected to the correlation system and configured to store the multiple sources of biometric information;
wherein the correlation system is configured to initiate an automatic comparison of the single individual with a plurality of previously enrolled individuals upon enrollment of the single individual, and
wherein the correlation system is configured to periodically compare the single individual with at least one other enrolled individual to determine whether the single individual is using multiple personas.

17. The system of claim 16, wherein the correlation system is configured to establish the multiple personas automatically from the at least two types of biometrics.

18. The system of claim 16, wherein the high-level fusion system is configured to combine at least a visual biometric with a voice biometric.

19. The system of claim 16, wherein the correlation system is configured to identify the multiple personas based at least in part upon the low-level fusion similarity score in addition to the high-level fusion similarity score.

20. The system of claim 16, wherein the correlation system is configured to identify the multiple personas by comparing data associated with a first individual with data associated with a different individual in the data store; and
wherein the correlation system is configured to identify the multiple personas by matching a first biometric associated with the first individual with a second biometric associated with the different individual included in the data store.

* * * * *